(12) United States Patent
Usui et al.

(10) Patent No.: US 8,810,181 B2
(45) Date of Patent: Aug. 19, 2014

(54) CONTROL APPARATUS AND MEASURING APPARATUS

(75) Inventors: Tomohiro Usui, Utsunomiya (JP); Yo Terashita, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 243 days.

(21) Appl. No.: 13/339,844

(22) Filed: Dec. 29, 2011

(65) Prior Publication Data

US 2012/0169265 A1  Jul. 5, 2012

(30) Foreign Application Priority Data

Jan. 5, 2011 (JP) ................. 2011-000491

(51) Int. Cl.
  *H02P 29/00* (2006.01)
  *H02P 21/00* (2006.01)
(52) U.S. Cl.
  CPC .................. *H02P 21/0089* (2013.01)
  USPC ........... 318/494; 318/135; 318/649; 318/687; 318/685
(58) Field of Classification Search
  CPC .................................. H02P 21/0089
  USPC ........... 318/494, 135, 649, 687, 685
  See application file for complete search history.

(56) References Cited

U.S. PATENT DOCUMENTS

| | | | |
|---|---|---|---|
| 5,726,542 A | 3/1998 | Ebihara | |
| 6,242,882 B1 * | 6/2001 | Kaneko et al. | 318/700 |
| 6,639,377 B2 * | 10/2003 | Iwaji et al. | 318/700 |
| 6,812,668 B2 * | 11/2004 | Akiyama | 318/610 |
| 2005/0270545 A1 | 12/2005 | Taffet | |
| 2009/0024278 A1 | 1/2009 | Kondo et al. | |

FOREIGN PATENT DOCUMENTS

| | | |
|---|---|---|
| JP | 2004-093181 | 3/2004 |
| JP | 2009-101885 | 5/2009 |

OTHER PUBLICATIONS

Search report from E.P.O., mail date is Apr. 20, 2012.

* cited by examiner

*Primary Examiner* — David Luo
(74) *Attorney, Agent, or Firm* — Greenblum & Bernstein, P.L.C.

(57) ABSTRACT

A control apparatus for controllably driving a drive mechanism which displaces a movable member, includes: an electric-current detecting unit configured to detect electric current for driving the drive mechanism; a speed control unit configured to set a target electric-current according to a drive speed at which the drive mechanism is caused to drive the movable member; and an electric-current control unit configured to multiply, by an integral gain and a proportional gain, an electric-current deviation between a target electric-current and a detection electric-current detected by the electric-current detecting unit to set output electric-current to be output to the drive mechanism, wherein the current control unit changes at least one of the integral gain and the proportional gain according to the drive speed of the drive mechanism.

10 Claims, 6 Drawing Sheets

CONTROL APPARATUS AND MEASURING APPARATUS

BACKGROUND

1. Field of the Invention

The present invention relates to a control apparatus for controlling a gain to a variable electric-current, and a measuring apparatus having this control apparatus.

2. Description of the Related Art

Hitherto, there has been an industrial machine having a circuit that controls drive electric-current for driving a drive mechanism (see, e.g., JP-A-2004-93181). A surface texture measuring apparatus disclosed in JP-A-2004-93181 has a fine feed mechanism that displaces a measuring element in a fine range, and a coarse feed mechanism that largely displaces the measuring element. The fine feed mechanism is controlled by a fine feed mechanism control circuit. The fine feed mechanism control circuit has two-stages of proportional-plus-integral (PI) circuits (i.e., a first PI circuit and a second PI circuit) that perform two stages of proportional-plus-integral processes, respectively. The first PI circuit and the second PI circuit are configured to have the same configuration. Thus, the first PI circuit and the second PI circuit are set to be the same in time-constant and gain-constant to maximize the responsiveness of each of the circuits.

Meanwhile, the above conventional apparatus is set such that each of a proportional gain and an integral gain of the PI circuit is set at a constant appropriate value, regardless of, e.g., which of a high-speed driving state, a low-speed driving state, and a stopping state the current state of the drive mechanism is. However, if the drive speed of the drive mechanism changes, i.e., if an electric-current for causing the drive mechanism to drive the measuring element is changed, sometimes, the appropriate value differs from the above set appropriate value. Accordingly, the conventional apparatus has a problem in that although an appropriate value is set in the conventional drive mechanism at a constant value by assuming all changes of the electric-current, sometimes, sufficient control performance is not obtained.

SUMMARY

In view of the above problem, an object of the invention is to provide a control apparatus that improves control performance, and a measuring apparatus having such a control apparatus.

A control apparatus according to the invention is that for controllably driving a drive mechanism which displaces a movable member. The control apparatus is featured by including an electric-current detecting unit configured to detect electric-current for driving the drive mechanism, a speed control unit configured to set a target electric-current according to a drive speed at which the drive mechanism is caused to drive the movable member, and an electric-current control unit configured to multiply, by an integral gain and a proportional gain, an electric-current deviation between a target electric-current and a detection electric-current detected by the electric-current detecting unit to set output electric-current to be output to the drive mechanism. The current control unit changes at least one of the integral gain and the proportional gain according to the drive speed of the drive mechanism.

According to the invention, the electric-current control unit changes, to an optimal value appropriate to the target electric-current, at least one of the integral gain and the proportional gain according to the drive speed of the drive mechanism, i.e., a speed of driving the movable member. Thus, optimal gain control according to the target electric-current for driving the movable member can be performed. Thus, control performance can be improved.

Preferably, in the control apparatus according to the invention, the electric-current control unit changes both the integral gain and the proportional gain according to the drive speed of the drive mechanism.

According to the invention, the electric-current control unit changes both the integral gain and the proportional gain according to the drive speed of the drive mechanism. The responsiveness of the drive mechanism can be improved by changing and setting the proportional gain to an appropriate value according to the target electric-current. The follow capability of the drive mechanism can be improved by enhancing the integral gain. Although it is sufficient for enhancing the control performance of the control apparatus to change only one of the proportional gain and the integral gain to an appropriate value, both the responsiveness and the follow capability of the drive mechanism can be improved by changing, according to the invention, both the proportional gain and the integral gain. Thus, better control performance can be obtained.

In the control apparatus according to the invention, if the drive speed of the drive mechanism increases from a previously set drive speed, preferably, the electric-current control unit sets at least one of the integral gain and the proportional gain to be a gain smaller than a previously set gain. If the drive speed of the drive mechanism decreases from a previously set drive speed, preferably, the electric-current control unit sets at least one of the integral gain and the proportional gain to be a gain larger than a previously set gain.

According to this invention, if the drive speed of the drive mechanism increases, the electric-current control unit decreases at least one of the integral gain and the proportional gain. Generally, when the drive speed increases, vibration easily occurs in the drive mechanism. If the proportional gain and the integral gain are high, vibration occurs more easily. Accordingly, if a maximum proportional gain and a maximum integral gain are set within a range in which no vibration occurs in the drive mechanism in a state in which the drive speed is low, vibration in the drive mechanism occurs when the drive speed is increased without changing the gains. Thus, it becomes difficult to the control apparatus to normally control the movable member. In contrast, if the drive speed increases, according to the invention, the gain is changed to a smaller gain. Thus, the drive mechanism can be prevented from oscillating. The control performance can be improved by suppressing the vibration of the drive mechanism. On the other hand, if the values of the proportional gain and the integral gain are small when the drive speed is decreased, sometimes, the responsiveness and the follow capability of the drive mechanism are deteriorated, and the control performance is decreased. In contrast, according to the invention, if the drive speed of the drive mechanism is reduced, the values of the proportional gain and the integral gain are increased. Thus, the responsiveness and the follow capability can be improved, and the control performance can be improved.

In the control apparatus according to the invention, if the drive speed of the drive mechanism is 0, preferably, the electric-current control unit sets at least one of the integral gain and the proportional gain to be a gain smaller than a previously set gain.

According to this invention, if the drive speed is 0, so that driving is stopped, the proportional gain and the integral gain are set to smaller values, respectively. For example, even if the drive mechanism is made to stand by at a preliminarily set stopping-position to stop a driving-operation, sometimes, electric-current is output to the drive mechanism. In such a case, at least one of the proportional gain and the integral gain is set to a smaller value. Thus, electric-power saving can be achieved.

The measuring apparatus according to the invention is featured by including the above control apparatus, and in that the above movable member is a measuring element contactable with a measuring object.

According to this invention, the performance of controlling the movement of the measuring element in the measuring apparatus can be improved. Thus, high-precision measuring can be performed.

In the measuring apparatus according to the invention, preferably, the electric-current control unit is configured as follows. That is, when the measuring object is measured by the measuring element, the electric-current control unit changes at least one of the integral gain and the proportional gain to an associated measurement gain. When the measuring element is moved at high speed to the measuring object by performing relative displacement thereof, the electric-current control unit changes at least one of the integral gain and the proportional gain to an associated movement gain. When the measuring element is stopped to perform neither measurement using the measuring element nor movement of the measuring element, the electric-current control unit changes at least one of the integral gain and the proportional gain to an associated stopping gain.

According to this invention, at measurement, the electric-current control unit changes the proportional gain and the integral gain to the associated measurement gains, respectively. At the high-speed movement of the movable element, the electric-current control unit changes the proportional gain and the integral gain to the associated movement gains, respectively. At stoppage, the electric-current control unit changes the proportional gain and the integral gain to the associated stopping gains, respectively. According to such invention, the electric-current control unit simply changes the values of the proportional gain and the integral gain to those of preliminarily set gains, depending upon the state of the measuring apparatus, i.e., which of the measurement state, the high-speed movement state, and the stopping state the measuring apparatus's state is. Thus, the setting of the gain can easily be achieved. In addition, a gain appropriate for each state can be set.

According to the invention, the control apparatus sets at least one of the integral gain and the proportional gain according to the drive speed of the drive mechanism at an optimal appropriate value. Thus, the control apparatus can implement optimal gain control and improve the control performance of the drive mechanism.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

[First Embodiment]

Hereinafter, a three-dimensional measuring machine (measuring apparatus) according to a first embodiment of the invention is described with reference to the accompanying-drawings.

Figure 1:
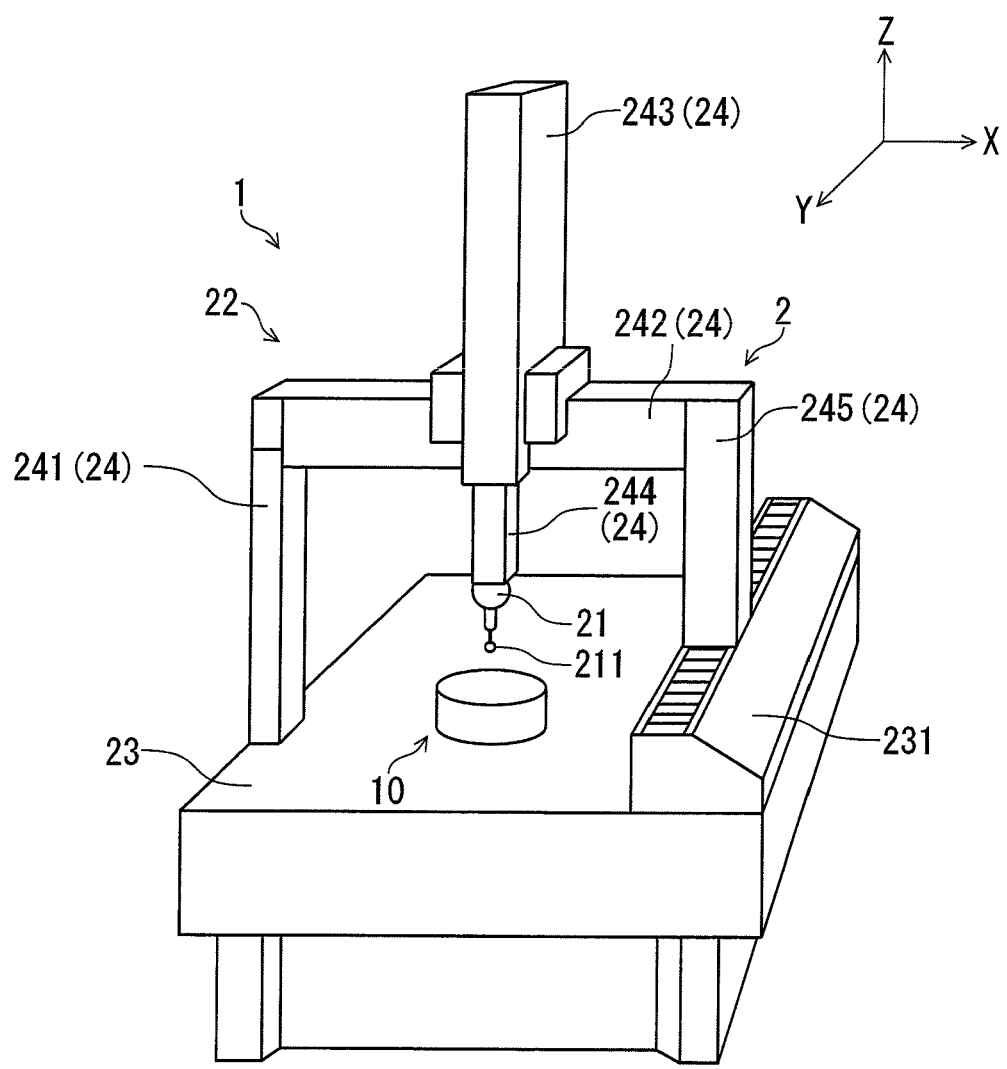
FIG. 1 is a diagram illustrating a schematic configuration of a three-dimensional measuring machine (measuring apparatus) according to a first embodiment of the invention.
Figure 2:
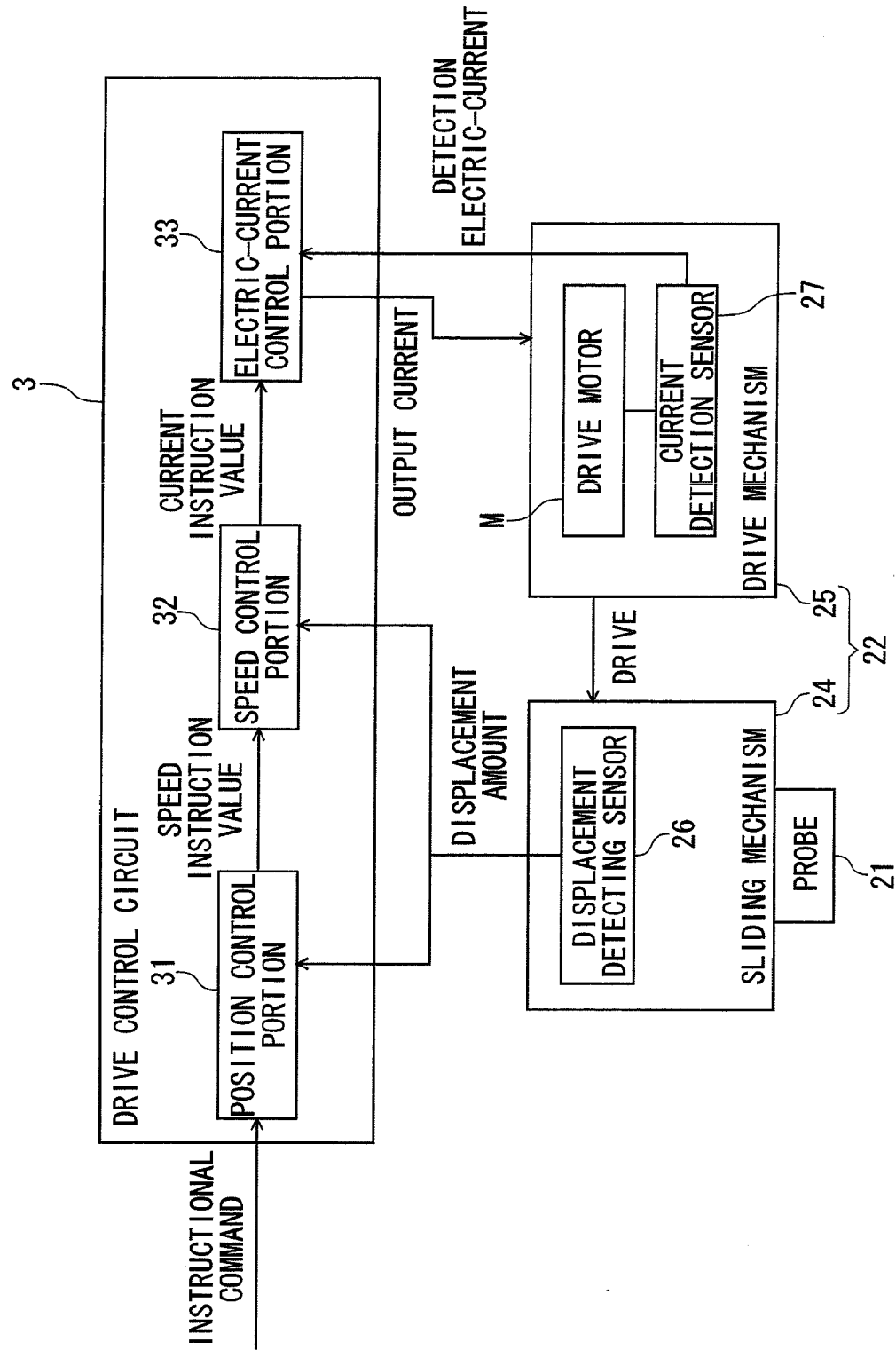
FIG. 2 is a block diagram illustrating a schematic configuration of a drive circuit incorporated into an apparatus body according to the first embodiment.

FIG. 1 is a diagram illustrating a schematic configuration of the three-dimensional measuring machine serving as an industrial machine according to the first embodiment of the invention. FIG. 2 is a block diagram illustrating a schematic configuration of a control circuit board incorporated into an apparatus body according to the present embodiment.

The three-dimensional measuring machine (measuring apparatus) 1 is configured to include a probe 21 having a measuring element 211 serving as a movable member according to the invention to be contacted with a measuring object 10, a moving mechanism 22 that displaces the probe 21, a displacement detecting sensor 26 that detects an amount of displacement of the probe 21 (see FIG. 2), an electric-current detecting sensor (an electric-current detecting unit (see FIG. 2)) 27 that detects drive electric-current for driving the moving mechanism 22, and a drive control circuit 3 (see FIG. 2) serving as a drive-mechanism control apparatus that controls driving performed by the driving mechanism 25.

The moving mechanism 22 includes a sliding mechanism 24 that holds the base-side of the probe 21 and enables the sliding movement of the probe 21, and the drive mechanism 25 that moves the probe 21 by driving the sliding mechanism 24.

The sliding mechanism 24 includes columns 241 and 245 respectively extending from both ends in X-axis direction of a base 23 in +Z-axis direction to be slidable along Y-axis direction on a guide 231 provided to extend along Y-axis direction, a beam 242 supported by the columns 241 and 245, the beam 242 extending in X-axis direction, a slider 243 cylindrically formed to extend in Z-axis direction and to be slidable on the beam 242 in X-axis direction, and a ram 244 inserted into the slider 243 to be slidable in the slider 243 in Z-axis direction. The sliding mechanism 24 has a displacement detecting sensor 26 that detects the position of the probe 21 (see FIG. 2). The displacement detecting sensor 26 includes a Y-coordinate displacement detecting sensor provided on the column 241, an X-coordinate displacement detecting sensor provided on the slider 243, and a Z-coordinate displacement detecting sensor provided on the ram 244. For example, a linear encoder configured to detect an amount of displacement of a scale provided on each of Y-axis, X-axis, and Z-axis can be used as the displacement detecting sensor 26. Alternatively, a rotary encoder configured to detect the number of revolutions of the drive shaft of each drive motor can be used as the displacement detecting sensor 26.

The drive mechanism 25 has a drive motor M (see FIG. 4) that moves the sliding mechanism holding a probe 21 along an X-axis, a Y-axis, and a Z-axis directions. Particularly, the drive motor M includes a Y-axis drive motor causing the column 241 to perform sliding movement along Y-axis direction, an X-axis drive motor moving the slider 243 along the beam 242 and X-axis direction, and a Z-axis drive motor moving the ram 244 along Z-axis direction. In addition, the drive mechanism 25 has a drive transmission mechanism transmitting a driving force supplied from the drive motor M to the sliding mechanism 24. The drive mechanism 25 causes the column 241, the slider 243, and the ram 244 by a driving force of the drive motor to perform sliding movement.

An electric-current detecting sensor 27 detects drive electric-current flowing through the drive motor M so as to drive the drive motor M. This electric-current detecting unit is provided corresponding to the drive motor corresponding to each of X-axis, Y-axis and Z-axis.

As illustrated in FIG. 2, a drive control circuit 3 includes a position control portion 31, a speed control portion (speed control unit) 32 controlling the drive speed of the drive mechanism 25 based on a speed instruction value input from the position control portion 31, and an electric-current control portion (electric-current control unit) 33 controlling electric-current fed through the drive motor M of the drive mechanism 25, based on an electric-current instruction value input from the speed control portion 32.

The position control portion 31 performs control operations of displacing the probe 21 to an intended coordinate position and detecting the coordinate position of the probe 21, based on an operation instruction signal input from, e.g., an operation controller. The operation instruction signal input to the position control portion 31 includes instructional commands such as a movement instructional-command indicating that the measuring element 211 is moved at high speed towards the measuring object 10, a measuring instructional-command indicating that the measuring object 10 is measured using the measuring element 211, and a stopping instructional-command indicating that the measuring element 211 is stopped and put into a standby state, in addition to a direction in which the measuring element 211 is displaced, and a displacement amount representing an amount of movement of the measuring element 211. The position control portion 31 changes the drive mode of the drive mechanism 25 and outputs a speed instruction value to the speed control portion 32 according to each drive mode. Thus, according to the present embodiment, a drive speed, at which the drive mechanism 25 is caused to drive the measuring element corresponding to each drive mode, is preliminarily set. At every change of the drive mode, the position control portion 31 outputs the preliminarily set drive speed to the speed control portion 32 as the speed instruction value. For example, when a movement instructional-command is input, the position control portion 31 outputs to the speed control portion 32 a speed instruction value (target drive speed) for causing the drive mechanism 25 to drive the measuring element at a drive speed of 300 millimeters (mm)/second (s). When a measuring instructional-command is input, the position control portion 31 generates a speed instruction value (target drive speed) for causing the drive mechanism 25 to drive the measuring element at a drive speed of 3 mm/s. Then, the position control portion 31 outputs the generated speed instruction value to the speed control portion 32.

Figure 3:
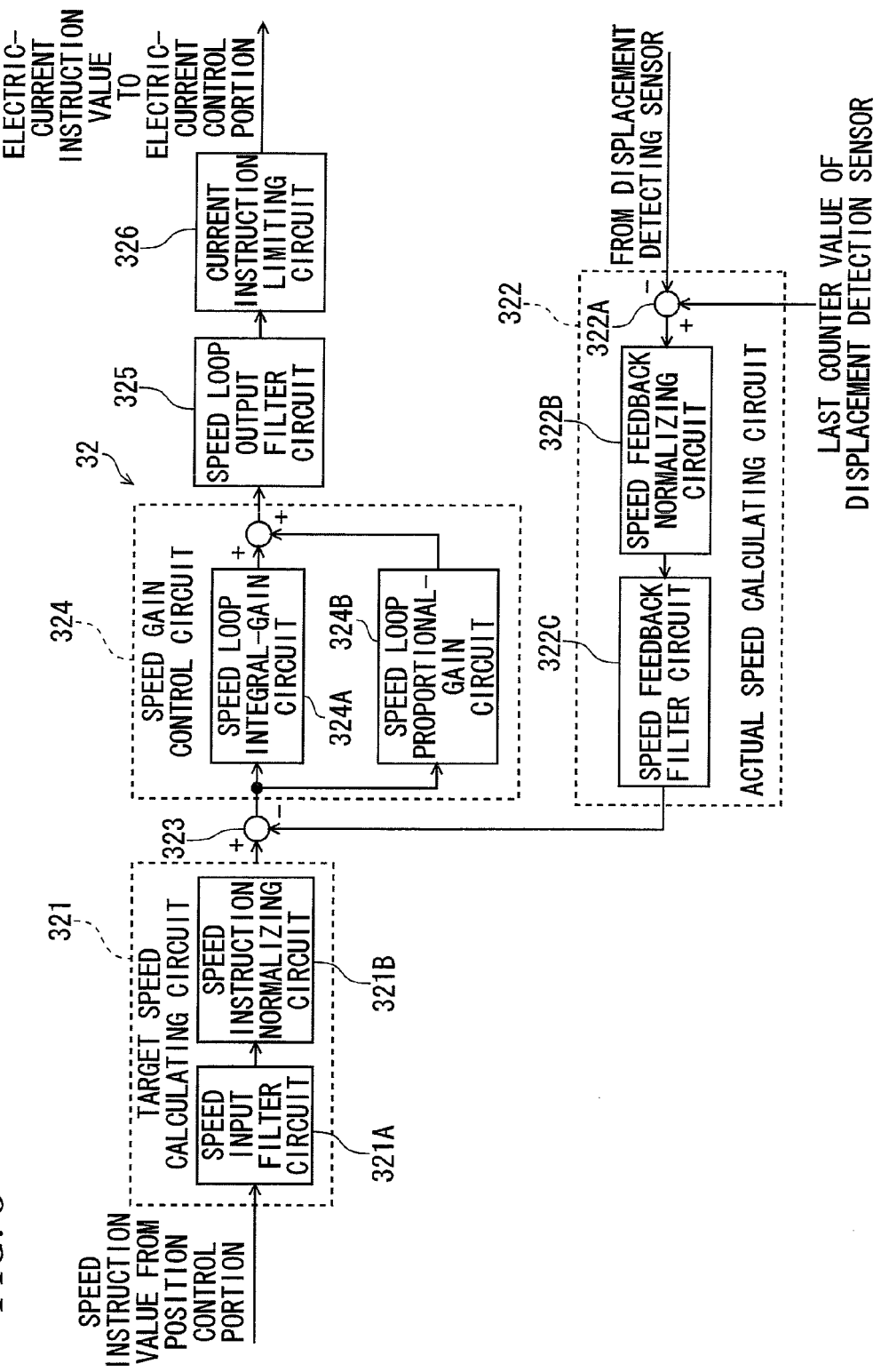
FIG. 3 is a loop block diagram illustrating a speed control portion according to the first embodiment.

FIG. 3 is a loop block diagram illustrating the speed control portion 32. As illustrated in FIG. 3, the speed control portion 32 includes a target speed calculating circuit 321 shape a signal representing a speed instruction value, an actual speed calculating circuit 322 calculating an actual speed, a speed comparator 323 that compares the target speed and the actual speed and calculates the difference (speed deviation) therebetween, a speed gain control circuit 324 multiplying a signal value output from the speed comparator 323 by an integral gain and a proportional gain, a speed loop output filter circuit 325 shape a signal by filtering a signal value sent from the speed gain control circuit 324, and an electric-current instruction limiting circuit 326 calculating an electric-current instruction value based on a signal value output from the speed loop output filter circuit 325.

A target speed calculating circuit 321 includes a speed input filter circuit 321A and a speed instruction normalizing circuit 321B. The speed input filter circuit 321A shapes the waveform of a signal representing a speed instruction value input from the position control portion 31 by applying a speed input filter to the signal. Then, the speed instruction normalizing circuit 321B normalizes a signal output from the speed input filter circuit 321A and outputs a resultant signal to the speed comparator 323.

An actual speed calculating circuit 322 calculates an actual drive speed of the measuring element 211 from a displacement signal output from the displacement detecting sensor 26. More specifically, the actual speed calculating circuit 322 includes a speed change calculating portion 322A, a speed feedback normalizing circuit 322B, and a speed feedback filter circuit 322C. The speed change calculating portion 322A calculates the difference in signal value between a displacement signal output from the displacement detecting sensor 26 and the last displacement signal latched by the displacement signal counter. Then, the calculated difference is differentiated. Thus, the actual drive speed (actual speed) of the probe 21 is calculated. The speed feedback normalizing circuit 322B multiplies a signal value calculated at the speed change calculating portion 322A by a coefficient normalizing the calculated actual speed. The speed feedback filter circuit 322C shapes the signal waveform of a signal sent form the speed feedback normalizing circuit 322B by applying a filter to the signal. Then, the speed feedback normalizing circuit 322B outputs the speed comparator 323.

The speed comparator 323 compares a speed instruction value input from the target speed calculating circuit 321 with an actual speed value input from the actual speed calculating circuit 322, and calculates the difference (speed deviation) therebetween. Then, the speed comparator 323 outputs the calculated difference to a speed gain control circuit 324. The speed gain control circuit 324 includes a speed loop integral-gain circuit 324A multiplying a signal (representing a speed deviation) input from the speed comparator 323 by an integral gain, and a speed loop proportional-gain circuit 324B multiplying a signal (representing a speed deviation) input from the speed comparator 323 by a proportional gain. Then, the speed gain control circuit 324 adds a signal value multiplied by an integral gain at the speed loop integral-gain circuit 324A to a signal value multiplied by a proportional gain by the speed loop proportional-gain circuit 324B. Then, the speed gain control circuit 324 outputs a result of the addition to a speed loop output filter circuit 325. Each of the values of the integral gain and the proportional gain of the speed gain control circuit 324 is set at a preliminarily set optimal value. The values of the integral gain and the proportional gain are determined by, e.g., preliminarily conducting an appropriate value test when the three-dimensional measuring machine 1 is manufactured.

The speed loop output filter circuit 325 shapes the waveform of a signal sent from the speed gain control circuit 324 by applying an output filter to a signal value. Then, the speed loop output filter circuit 325 outputs a resultant signal to an electric-current instruction limiting circuit 326. The electric-current instruction limiting circuit 326 calculates, based on the signal value (drive speed value) input from the speed loop output filter circuit 325, a target electric-current value of electric-current fed to the drive motor M. Then, the electric-current instruction limiting circuit 326 outputs the calculated target electric-current value to the electric-current control portion 33 as an electric-current instruction value.

Figure 4:
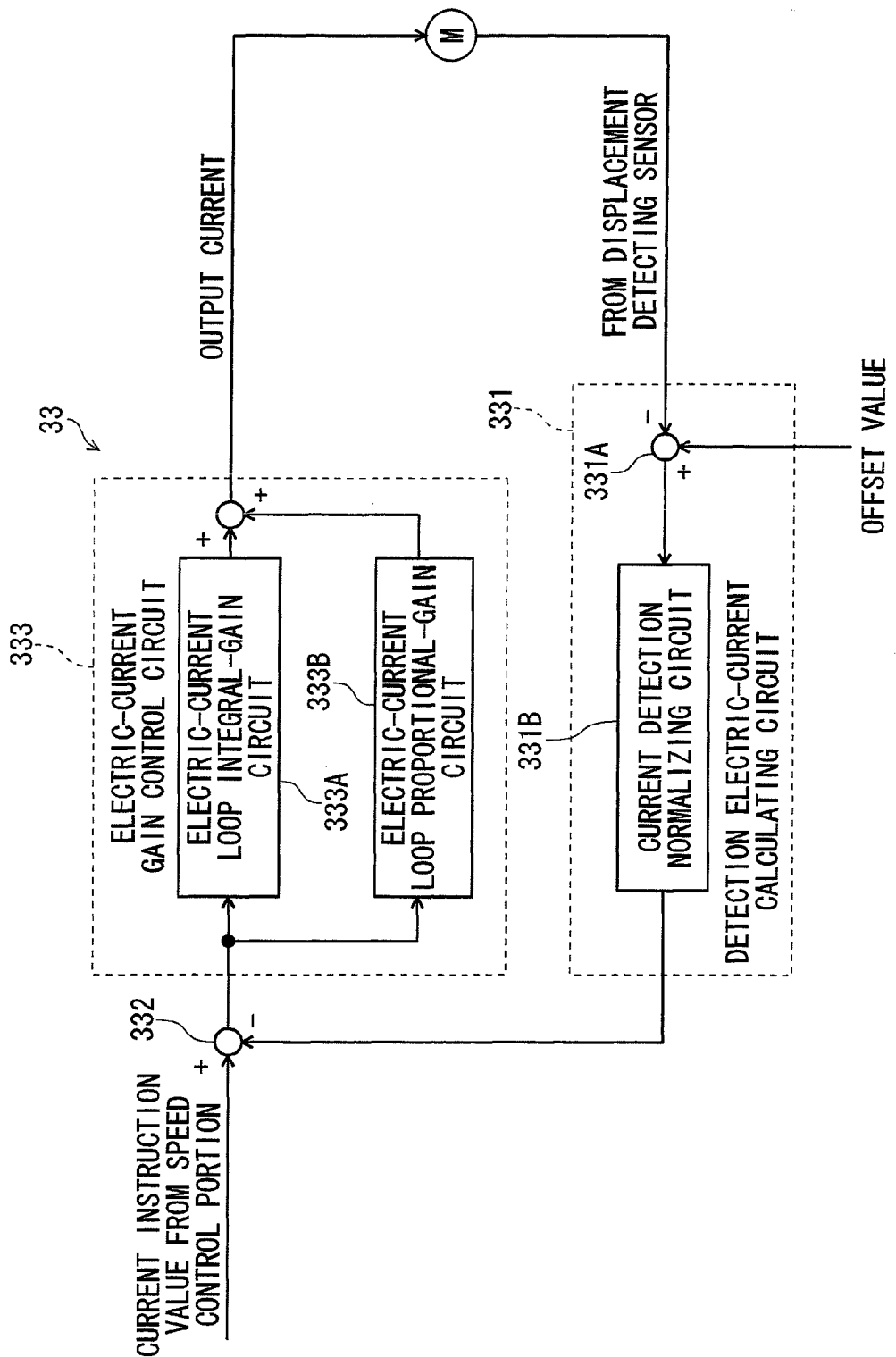
FIG. 4 is a loop block diagram illustrating the current control portion according to the first embodiment.

FIG. 4 is a loop block diagram illustrating the electric-current control portion 33. As illustrated in FIG. 4, the electric-current control portion 33 includes a detection electric-current calculating circuit 331, an electric-current comparator 332, and an electric-current gain control circuit 333.

The detection electric-current calculating circuit 331 includes a difference calculating circuit 331A that calculates the difference between a detection electric-current value detected by the electric-current detecting sensor 27 and an offset value, and an electric-current detection normalizing circuit 331B that normalizes a signal sent from the difference calculating circuit 331A.

The electric-current comparator 332 compares a detection electric-current value sent from the detection electric-current calculating circuit 331 with an electric-current instruction value sent from the speed control portion 32, and calculates the difference (electric-current deviation) therebetween.

The electric-current gain control circuit 333 includes an electric-current loop integral-gain circuit 333A multiplying a signal value input from the electric-current comparator 332 by an integral gain, and an electric-current loop proportional-gain circuit 333B multiplying a signal value input from the electric-current comparator 332 by a proportional gain. The value of the integral gain in the electric-current loop integral-gain circuit 333A, and that of the proportional gain in the electric-current loop proportional gain circuit 333B are changed according to the actual speed of the drive mechanism 25. That is, when the drive mode of the drive mechanism 25 is changed by an instructional command input to the position control portion 31, each of the integral gain and the proportional gain in the electric-current gain control circuit 333 is changed to an appropriate value that is optimal for the drive speed of the drive mechanism 25 in each drive mode.

The values of the integral gain and the proportional gain are determined by, e.g., preliminarily conducting a test when the three-dimensional measuring machine 1 is manufactured. According to the present embodiment, if a movement instructional-command is input to the position control portion 31, the target drive speed is set at 300 mm/s. If a measurement instructional-command is input thereto, the target drive speed is set at 3 mm/s. Accordingly, in a state in which the drive mechanism 25 is preliminarily caused to drive at 300 mm/s, maximum values of the integral gain and the proportional gain are experimentally obtained within a range in which no vibration occurs in the drive mechanism 25. Then, the obtained values are set as movement gains (i.e., a movement integral-gain, and a movement proportional-gain) to be used when a movement instructional-command is input thereto. On the other hand, in a state in which the drive mechanism 25 is preliminarily caused to drive at 3 mm/s, maximum values of the integral gain and the proportional gain are experimentally obtained in a range in which no vibration occurs in the drive mechanism 25. Then, the obtained values are set as measurement gains (i.e., a measurement integral-gain, and a measurement proportional-gain) to be used when a measurement instructional-command is input. In addition, generally, the higher the drive speed becomes, the easier the vibration is generated by applying the gain to the signal value. Thus, each movement gain is smaller than the associated measurement gain.

In the three-dimensional measuring machine 1, even when the drive mechanism 25 is stopped, standby electric-current flows in the drive motor M. In this case, responsiveness and follow capability are not required to operate the probe 21. Thus, each of the integral gain and the proportional gain is set at a minimum value (stopping-gain), which is substantially 0.

Figure 5:
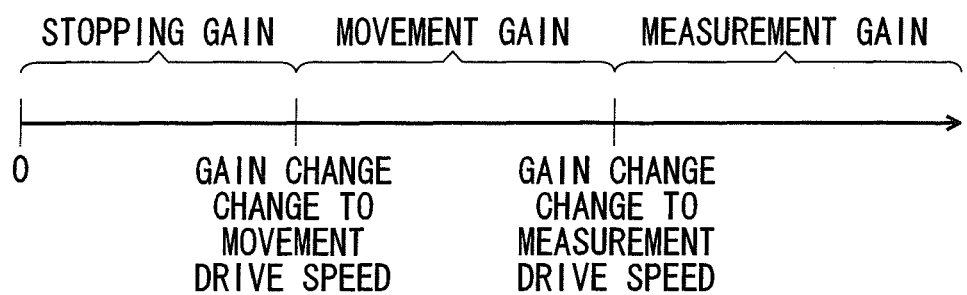
FIG. 5 is a chart illustrating change of a gain set in a current gain control circuit when the drive mode of the drive mechanism according to the first embodiment is changed over among a stopping state, a high-speed movement state, and a measurement state.

FIG. 5 is a chart illustrating change of the gain set in the electric-current gain control circuit 333 when the drive mode of the drive mechanism 25 is changed among a stopping state, a high-speed movement state, and a measurement state. If the drive mode (thus, the instructional command input to the position control portion 31) is changed and the target drive speed is changed in the present embodiment, as illustrated in FIG. 5, the drive mechanism 25 is caused to drive according to the target drive speed. Consequently, the actual speed calculated in the actual speed calculating circuit 322 changes. Thus, the integral gain and the proportional gain used in the electric-current gain control circuit 333 are changed. Then, a signal to which the above integral gain and the above proportional gain are applied in the electric-current gain control circuit 333 is output to the drive motor M as that representing an output electric-current.

Figure 6:
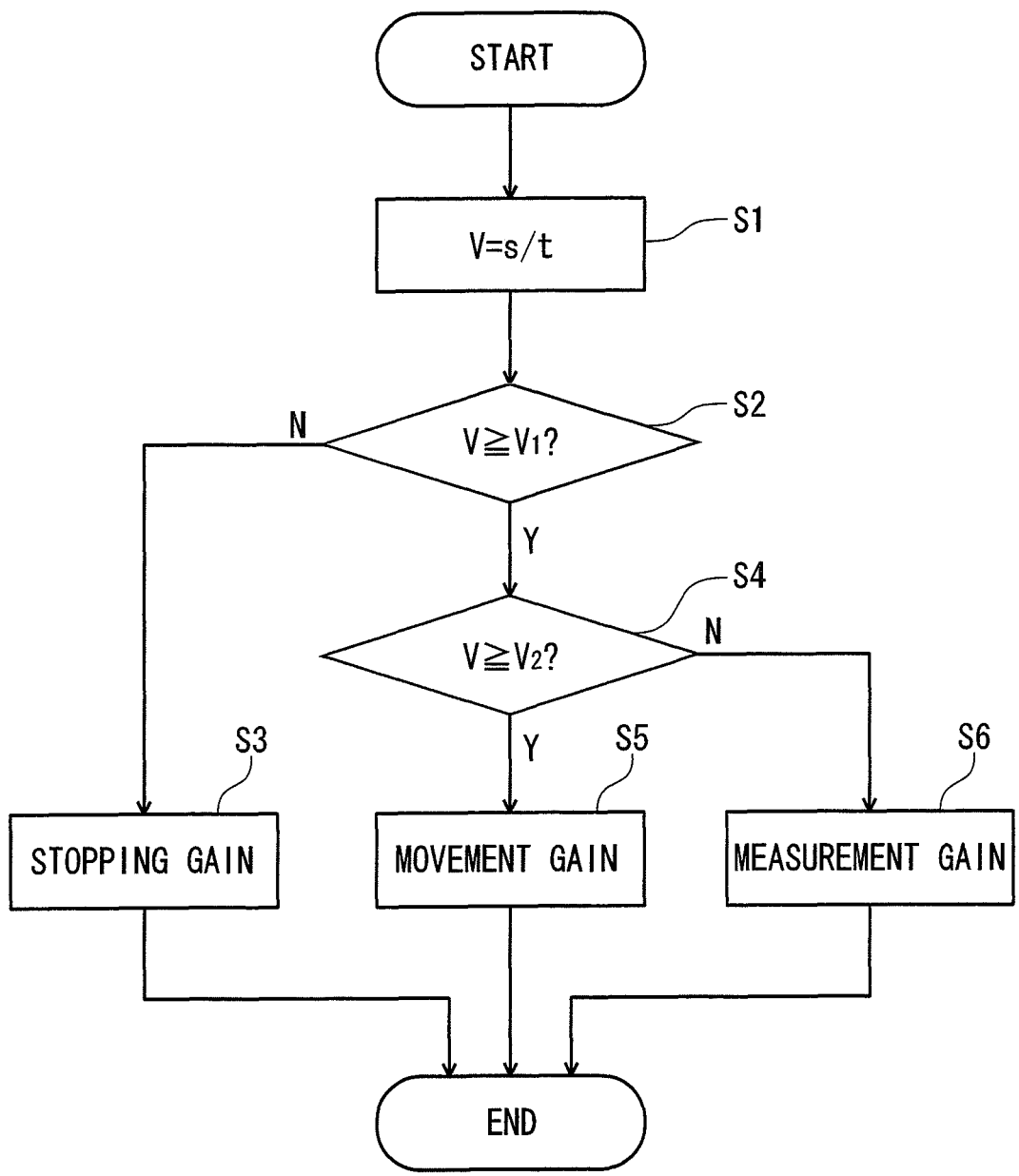
FIG. 6 is a flowchart illustrating an electric-current control process of the three-dimensional measuring machine according to the first embodiment.

Next, an electric-current control process performed in the above three-dimensional measuring machine 1 is described hereinafter with reference to FIG. 6. FIG. 6 is a flowchart illustrating an electric-current control process of the three-dimensional measuring machine 1 according to the first embodiment. When an instruction command is input to the position control portion 31, and a speed instruction value is input from the position control portion 31 to the speed control portion 32, electric current according to the speed command value is output from the electric-current control portion 33 to the drive motor M. At that time, in step S1, the actual speed calculating circuit 322 of the speed control portion 32 calculates from an amount s of change detected by the displacement detecting sensor an actual speed $V (=s/t)$. Then, in step S2, the electric-current gain control circuit 333 of the electric-current control portion 33 compares the actual speed V calculated in step S1 with a preliminarily set measurement drive speed $V_1 (=3$ mm/s).

In step S2, if the actual speed V is equal to or less than $V_1 (V \leq V_1)$ (i.e., "N" in step S2 in FIG. 6), in step S3, each of the stopping-gains is set as an associated one of the integral gain and the proportional gain. Consequently, if a stopping instructional-command is input to the position control portion 31, electric-power saving can be implemented.

On the other hand, in step S2, if the actual speed V is equal to or more than $V_1 (V \geq V_1)$ (i.e., "Y" in step S2 in FIG. 6), in step S4, the actual speed V calculated in step S1 is further compared with a preliminarily set movement drive speed $V_2 (=300$ mm/s).

In step S4, if the actual speed V is equal to or more than $V_2 (V \geq V_2)$ (i.e., "Y" in step S4 in FIG. 6), in step S5, the movement integral-gain and the movement proportional-gain are set as the integral gain and the proportional gain, respectively. Consequently, even if the movement instructional-command is input to the position control portion 31, and the drive mechanism 25 is moved at a speed of 300 mm/s, no vibration occurs in the drive mechanism 25. In addition, high responsiveness and follow capability can be obtained.

In step S4, if the actual speed V is equal to or less than $V_2 (V \leq V_2)$ ("N" in step S4 in FIG. 6), in step S6, the measurement integral-gain and the measurement proportional-gain are set as the integral gain and the proportional gain, respectively. Consequently, if a measurement instructional-command is input to the position control portion 31 and the measuring element 211 is contacted with the measuring object 10 and made to perform a scanning operation, the drive mechanism 25 can be operated with high responsiveness and follow capability.

[Advantages of First Embodiment]

As described above, in the three-dimensional measuring machine 1 according to the above first embodiment, the drive control circuit 3 controlling electric current to be fed to the drive motor M of the drive mechanism 25 includes the electric-current gain control circuit 333 that multiplies an electric-current deviation between the electric-current instruction value input from the speed control portion 32 and a feedback electric-current value (detection electric-current value) by each of the integral gain and the proportional gain according to the drive speed of the drive mechanism 25. The electric-current gain control circuit 333 changes the appropriate values of the integral gain and the proportional gain according to the drive speed of the drive mechanism 25. Thus, the responsiveness and the follow capability of the drive mechanism 25 can be more improved by multiplying the electric-current deviation by the gain according to the drive speed thereof, as compared with the case of setting an electric-current value output to the drive motor M by multiplying the electric-current deviation by each of the integral gain and the proportional gain each of which is of the type set at a single value.

In addition, the electric-current gain control circuit 333 changes both the integral gain and the proportional gain according to the drive speed of the drive mechanism 25. Thus, the control performance can be more improved, as compared with, e.g., the case of changing only the integral gain according to the drive speed and that of changing only the proportional gain according to the drive speed.

In the three-dimensional measuring machine 1 according to the present embodiment, if a stopping instructional-command is input thereto as the instructional command, and if the three-dimensional measuring machine 1 enters a stopping mode, the electric-current gain control circuit 333 sets the stopping-gains (i.e., the stopping integral-gain and the stopping proportional-gain) as the integral gain and the proportional gain, respectively. If a movement instructional-command is input thereto and the drive mechanism 25 is caused to drive at the movement drive speed $V_2$(=300 mm/s), the gain control circuit 333 sets the movement gains (i.e., the movement integral-gain and the movement proportional-gain) as the integral gain and the proportional gain, respectively. If a measurement instructional-command is input thereto and the drive mechanism 25 is caused to drive the measuring element at the measurement drive speed $V_1$(=3 mm/s), the gain control circuit 333 sets the measurement gains (i.e., the measurement integral-gain and the measurement proportional-gain) as the integral gain and the proportional gain, respectively. Thus, the gains can easily be set with a simple circuit configuration by being changed and controlled according to the drive speed of the drive mechanism 25.

If the drive speed is increased from the measurement drive speed $V_1$(=3 mm/s) to the movement drive speed $V_2$(=300 mm/s), each of the integral gain and the proportional gain is set by being changed from the associated one of the measurement integral-gain and the measurement proportional-gain to the associated one of the movement integral-gain and the movement proportional-gain each of which is smaller in value than the associated one of the measurement integral gain and the proportional gain. Accordingly, the measurement gains and the movement gains are set at maximum gain values within a range in which no vibration occurs in the drive mechanism 25. Thus, good responsiveness and follow capability of the drive mechanism 25 are obtained. So control performance is improved. On the other hand, if a state in which the drive speed is the measurement drive speed $V_1$(=3 mm/s) is changed to a stopping state in which the drive speed is equal to 0 mm/s, each of the integral gain and the proportional gain is changed from the associated one of the measurement integral gain and the proportional gain and set at the associated one of the stopping integral-gain and the stopping proportional-gain each of which is smaller in value than the associated one of the measurement integral gain and the proportional gain. Consequently, electric-current consumption during the stopping state can be suppressed. In addition, electric-power saving can be achieved.

[Second Embodiment]

Next, a second embodiment of the invention is described hereinafter. A three-dimensional machine according to the second embodiment has a configuration similar to that according to the first embodiment, and differs from the three-dimensional machine according to the first embodiment only in gains set in the electric-current gain control circuit 333. That is, in the electric-current control circuit 333 according to the second embodiment, if the drive speed of the drive mechanism increases, the values of the integral gain and the proportional gain are decreased according to the drive speed. If the drive speed of the drive mechanism 25 is decreased, the values of the integral gain and the proportional gain are increased.

Accordingly, if the drive speed of the drive mechanism 25 is increased from the measurement drive speed $V_1$(=3 mm/s) to the movement drive speed $V_2$(=300 mm/s), the electric-current gain control circuit 333 sets, as the integral gain and the proportional gain, the movement gains (i.e., the movement integral-gain and the movement proportional-gain), which are smaller in value than the measurement gains (i.e., the movement integral-gain and the movement proportional-gain), respectively, similarly to the first embodiment. On the other hand, if the state of the drive mechanism 25 is changed from a state in which the drive speed thereof is set at the measurement drive speed $V_1$(=3 mm/s), to the stopping state in which the drive speed is 0, so that the drive speed is decreased, the electric-current gain control circuit 333 sets the integral gain and the proportional gain, which are larger the associated measurement gains (i.e., the measurement integral-gain and the measurement proportional-gain), respectively.

[Advantages of Second Embodiment]

As described above, in the three-dimensional measuring machine according to the second embodiment, the electric-current gain control circuit 333 decreases the integral gains and the proportional gains if the drive speed of the drive mechanism 25 increases. On the other hand, the electric-current gain control circuit 333 increases the integral gains and the proportional gains if the drive speed of the drive mechanism 25 decreases. With such a configuration, even in the stopping state, good responsiveness of the drive mechanism 25 can be obtained. For example, if the state of the three-dimensional measuring machine is returned to a measuring state from a standby state in which the drive mechanism 25 stops, the drive mechanism 25 can be caused with good responsiveness to drive.

[Examples of Modification]

The invention is not limited to the above embodiments. The invention includes the following modifications within a range in which the object of the invention can be achieved.

For example, in the above second embodiment, the electric-current gain control circuit 333 implements gain control by switching among the preliminarily set gains (movement gains, measurement gains, and stopping-gains). However, the electric-current gain control circuit can be configured to continuously change the gain according to the drive speed that continuously changes.

According to the above embodiments, the electric-current gain control circuit 333 of the electric-current control portion 33 changes the gain, based on the actual speed input from the actual speed calculating circuit 322 as the drive speed of the drive mechanism 25. The electric-current gain control circuit according to the invention is not limited thereto. For example, the electric-current gain control circuit 333 can change the gain based on the speed instruction value (target drive speed) output by the position control portion 31.

Although the electric-current gain control circuit 333 changes both the integral gain and the proportional gain when the drive speed of the drive mechanism 25 changes, the electric-current gain control circuit 333 can change, e.g., only the integral gain. Alternatively, the electric-current gain control circuit 333 can change, e.g., only the proportional gain. Even in such a case, good control performance can be obtained, as compared with the case of using only one type of a gain.

In the foregoing description, an example of applying the invention to the control apparatus of the drive mechanism 25 of the three-dimensional measuring machine (measuring apparatus) 1 has been described. The invention is not limited thereto. The control apparatus according to the invention can be used as, e.g., that for controlling electric current of a movable member of an industrial machine, such as a processing apparatus that processes a work by the movable member such as a robot arm, which can change the speed of the movable member. According to the above embodiments, the control apparatus is configured so as to divide an operation mode of the probe 21 of the three-dimensional measuring machine into sub-modes respectively corresponding to three driving states, i.e., the high-speed movement state, the measuring state, and the stopping state, and as to change the gain of the electric-current gain control circuit 333 when the control apparatus switches among the driving states. However, the control apparatus can be configured to switch among four or more driving states. Even in this case, an appropriate integral gain and an appropriate proportional gain can be set according to the drive speed of the drive mechanism 25 in each driving state. Thus, similarly to the above embodiments, the control performance of the drive mechanism 25 can be improved.

Specific structures and processes in implementing the invention can appropriately be changed to other structures and the like as long as an object of the invention can be achieved.

The invention can be applied to a measuring apparatus for performing measuring.

What is claimed is:

1. A control apparatus for controllably driving a drive mechanism which displaces a movable member, comprising:
an electric-current detector configured to detect electric current for driving the drive mechanism;
a speed controller configured to set a target electric-current according to a drive speed at which the drive mechanism drives the movable member; and
an electric-current controller configured to multiply, by an integral gain and a proportional gain, an electric-current deviation between a target electric-current and a detection electric-current detected by the electric-current detector, to set an output electric-current to be output to the drive mechanism, wherein
the electric-current controller changes at least one of the integral gain and the proportional gain according to the drive speed of the drive mechanism, such that
when the drive speed of the drive mechanism increases from a previously set drive speed, the electric-current controller sets at least one of the integral gain and the proportional gain to be smaller than a previously set gain; and
when the drive speed of the drive mechanism decreases from the previously set drive speed, the electric-current controller sets at least one of the integral gain and the proportional gain to be larger than the previously set gain.

2. The control apparatus according to claim 1, wherein the electric-current controller changes both the integral gain and the proportional gain according to the drive speed of the drive mechanism.

3. A measuring apparatus according to claim 2, wherein the movable member is a measuring element contactable with a measuring object.

4. The measuring apparatus according to claim 3, wherein:
when the measuring object is measured by the measuring element, the electric-current controller changes at least one of the integral gain and the proportional gain to an associated measurement gain;
when the measuring element is moved at high speed with respect to the measuring object, by relative displacement between the measuring element and the measuring object, the electric-current controller changes at least one of the integral gain and the proportional gain to an associated movement gain; and
when the measuring element is stopped to perform neither measurement using the measuring element nor movement of the measuring element, the electric-current controller changes at least one of the integral gain and the proportional gain to an associated stopping gain.

5. A control apparatus for controllably driving a drive mechanism which displaces a movable member, comprising:
an electric-current detector configured to detect electric current for driving the drive mechanism;
a speed controller configured to set a target electric-current according to a drive speed at which the drive mechanism drives the movable member; and
an electric-current controller configured to multiply, by an integral gain and a proportional gain, an electric-current deviation between a target electric-current and a detection electric-current detected by the electric-current detector, to set an output electric-current to be output to the drive mechanism, wherein
the electric-current controller changes at least one of the integral gain and the proportional gain according to the drive speed of the drive mechanism, such that
when the drive speed of the drive mechanism is 0, the electric-current controller sets at least one of the integral gain and the proportional gain to be smaller than a previously set gain.

6. The control apparatus according to claim 5, wherein the electric-current controller changes both the integral gain and the proportional gain according to the drive speed of the drive mechanism.

7. A measuring apparatus according to claim 6, wherein the movable member is a measuring element contactable with a measuring object.

8. The measuring apparatus according to claim 7, wherein:
when the measuring object is measured by the measuring element, the electric-current controller changes at least one of the integral gain and the proportional gain to an associated measurement gain;
when the measuring element is moved at high speed with respect to the measuring object, by relative displacement between the measuring element and the measuring object, the electric-current controller changes at least one of the integral gain and the proportional gain to an associated movement gain; and when the measuring element is stopped to perform neither measurement using the measuring element nor movement of the measuring element, the electric-current controller changes at least one of the integral gain and the proportional gain to an associated stopping gain.

9. A measuring apparatus for controllably driving a drive mechanism which displaces a movable member, comprising:
  an electric-current detector configured to detect electric current for driving the drive mechanism;
  a speed controller configured to set a target electric-current according to a drive speed at which the drive mechanism drives the movable member; and
  an electric-current controller configured to multiply, by an integral gain and a proportional gain, an electric-current deviation between a target electric-current and a detection electric-current detected by the electric-current detector, to set an output electric-current to be output to the drive mechanism, wherein
  the electric-current controller changes at least one of the integral gain and the proportional gain according to the drive speed of the drive mechanism,
  the movable member is a measuring element contactable with a measuring object,
  when the measuring object is measured by the measuring element, the electric-current controller changes at least one of the integral gain and the proportional gain to an associated measurement gain;
  when the measuring element is moved at high speed with respect to the measuring object, by relative displacement between the measuring element and the measuring object, the electric-current controller changes at least one of the integral gain and the proportional gain to an associated movement gain; and
  when the measuring element is stopped to perform neither measurement using the measuring element nor movement of the measuring element, the electric-current controller changes at least one of the integral gain and the proportional gain to an associated stopping gain.

10. The control apparatus according to claim 9, wherein the electric-current controller changes both the integral gain and the proportional gain according to the drive speed of the drive mechanism.

* * * * *